US012633094B2

(12) United States Patent
Zu

(10) Patent No.: US 12,633,094 B2
(45) Date of Patent: May 19, 2026

(54) NEURAL NETWORK INFERENCE ACCELERATION METHOD, TARGET DETECTION METHOD, DEVICE, AND STORAGE MEDIUM

(71) Applicant: BOE Technology Group Co., Ltd., Beijing (CN)

(72) Inventor: Chunshan Zu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 318 days.

(21) Appl. No.: 18/284,076

(22) PCT Filed: Jan. 10, 2023

(86) PCT No.: PCT/CN2023/071511
§ 371 (c)(1),
(2) Date: Sep. 26, 2023

(87) PCT Pub. No.: WO2023/160290
PCT Pub. Date: Aug. 31, 2023

(65) Prior Publication Data
US 2024/0161474 A1     May 16, 2024

(30) Foreign Application Priority Data

Feb. 23, 2022     (CN) .......................... 202210168811.7

(51) Int. Cl.
*G06V 10/776*     (2022.01)
*G06V 10/70*      (2022.01)
*G06V 10/82*      (2022.01)
(52) U.S. Cl.
CPC ............ *G06V 10/776* (2022.01); *G06V 10/82* (2022.01); *G06V 10/87* (2022.01)

(58) Field of Classification Search
CPC ........ G06N 3/04; G06N 3/045; G06N 3/0464; G06N 3/063; G06N 3/08; G06N 3/082;
(Continued)

(56) References Cited

U.S. PATENT DOCUMENTS 11,321,607 B2 * 5/2022 Shah ...................... G06F 9/5066
11,636,348 B1 * 4/2023 Tang ........................ G06N 7/01
706/16
(Continued)

FOREIGN PATENT DOCUMENTS

CN     109447033 A     3/2019
CN     111738419 A     10/2020
(Continued)

OTHER PUBLICATIONS

Zhengang Li et al. , "NPAS: A Compiler-aware Framework of Unified Network Pruning and Architecture Search for Beyond Real-Time Mobile Acceleration," Jun. 2021, Proceedings of the IEEE/CVF Conference on Computer Vision and Pattern Recognition (CVPR), 2021, pp. 14255-14262.*
(Continued)

*Primary Examiner* — Omar S Ismail
(74) *Attorney, Agent, or Firm* — Ling Wu; Stephen Yang; Ling and Yang Intellectual Property

(57) ABSTRACT

A neural network inference acceleration method includes: acquiring a neural network model to be accelerated and an accelerated data set; automatically performing accelerating process on the neural network model to be accelerated by using the accelerated data set to obtain the accelerated neural network model, wherein the accelerating process includes at least one of the following: model compression, graph optimization and deployment optimization, wherein the model compression includes at least one of the following: model quantification, model pruning and model distillation,
(Continued)

wherein the graph optimization is the optimization for the directed graph of the neural network model to be accelerated, and the deployment optimization is the optimization for the deployment platform of the neural network model to be accelerated; and performing inference evaluation on the accelerated neural network model.

15 Claims, 8 Drawing Sheets

(58) Field of Classification Search
CPC ........ G06N 3/084; G06N 5/04; G06V 10/776; G06V 10/82; G06V 10/87
See application file for complete search history.

(56) References Cited

U.S. PATENT DOCUMENTS

| | | | | |
|---|---|---|---|---|
| 11,734,549 | B2 * | 8/2023 | Kotler | G11C 11/41 706/15 |
| 11,734,605 | B2 * | 8/2023 | Kotler | G06N 3/04 706/12 |
| 2021/0012116 | A1 * | 1/2021 | Urtasun | G06N 3/09 |
| 2021/0063200 | A1 * | 3/2021 | Kroepfl | G01C 21/3841 |
| 2021/0174214 | A1 * | 6/2021 | Venkatesan | G06N 3/0495 |
| 2021/0201526 | A1 * | 7/2021 | Moloney | G06N 3/045 |
| 2021/0256384 | A1 * | 8/2021 | Wang | G06N 3/09 |
| 2021/0350233 | A1 | 11/2021 | Saboori et al. | |
| 2021/0397971 | A1 * | 12/2021 | Pardeshi | G06N 3/047 |
| 2022/0035878 | A1 * | 2/2022 | Sarah | G06N 3/082 |
| 2022/0067525 | A1 * | 3/2022 | Sequeira | G06N 3/063 |
| 2022/0269937 | A1 * | 8/2022 | Kim | G06N 3/08 |
| 2022/0343137 | A1 * | 10/2022 | Surendran | G06N 3/063 |
| 2022/0383640 | A1 * | 12/2022 | Vora | G06V 10/40 |
| 2022/0414455 | A1 * | 12/2022 | Collins | G06N 3/08 |
| 2023/0042004 | A1 * | 2/2023 | Kumar | G06V 20/41 |
| 2023/0051050 | A1 * | 2/2023 | Grover | G06N 3/063 |
| 2023/0405820 | A1 * | 12/2023 | Huang | B25J 9/1612 |
| 2024/0007414 | A1 * | 1/2024 | Jain | G06F 9/505 |

FOREIGN PATENT DOCUMENTS

| | | | | |
|---|---|---|---|---|
| CN | 111753878 | A | 10/2020 | |
| CN | 112070213 | A | 12/2020 | |
| CN | 112232509 | A | 1/2021 | |
| CN | 113052264 | A | 6/2021 | |
| EP | 4116885 | A1 * | 1/2023 | ............... G06N 3/04 |

OTHER PUBLICATIONS

Lei Deng et al. , "Model Compression and Hardware Acceleration for Neural Networks: A Comprehensive Survey," Mar. 20, 2020, Proceedings of the IEEE, vol. 108, No. 4, Apr. 2020, pp. 485-518.*

Sixing Yu et al., "Auto Graph Encoder-Decoder for Neural Network Pruning," Oct. 2021, Proceedings of the IEEE/CVF International Conference on Computer Vision (ICCV), 2021, pp. 6362-6368.*

Sergi Abadal et al., "Computing Graph Neural Networks: A Survey from Algorithms to Accelerators," Oct. 2021 , ACM Computing Surveys, vol. 54, No. 9, Article 191, pp. 191:1-191:30.*

Anthony Berthelier et al., "Deep Model Compression and Architecture Optimization for Embedded Systems: A Survey," Oct. 12, 2020, Journal of Signal Processing Systems (2021) 93, pp. 863-873.*

Yu Cheng et al., "Model Compression and Acceleration for Deep Neural Networks," Jan. 9, 2018, IEEE Signal Processing Magazine ( vol. 35, Issue: 1, Jan. 2018, pp. 126-133.*

Can Qin et al., "Slow Learning and Fast Inference: Efficient Graph Similarity Computation via Knowledge Distillation," Dec. 6, 2021, 35th Conference on Neural Information Processing Systems (NeurIPS 2021), pp. 1-9.*

Robert Stewart et al., "Optimising Hardware Accelerated Neural Networks with Quantisation and a Knowledge Distillation Evolutionary Algorithm, " Feb. 5, 2021, Electronics 2021, 10, 396, pp. 1-12.*

International Search Report for PCT/CN2023/071511 Mailed Jun. 2, 2023.

* cited by examiner

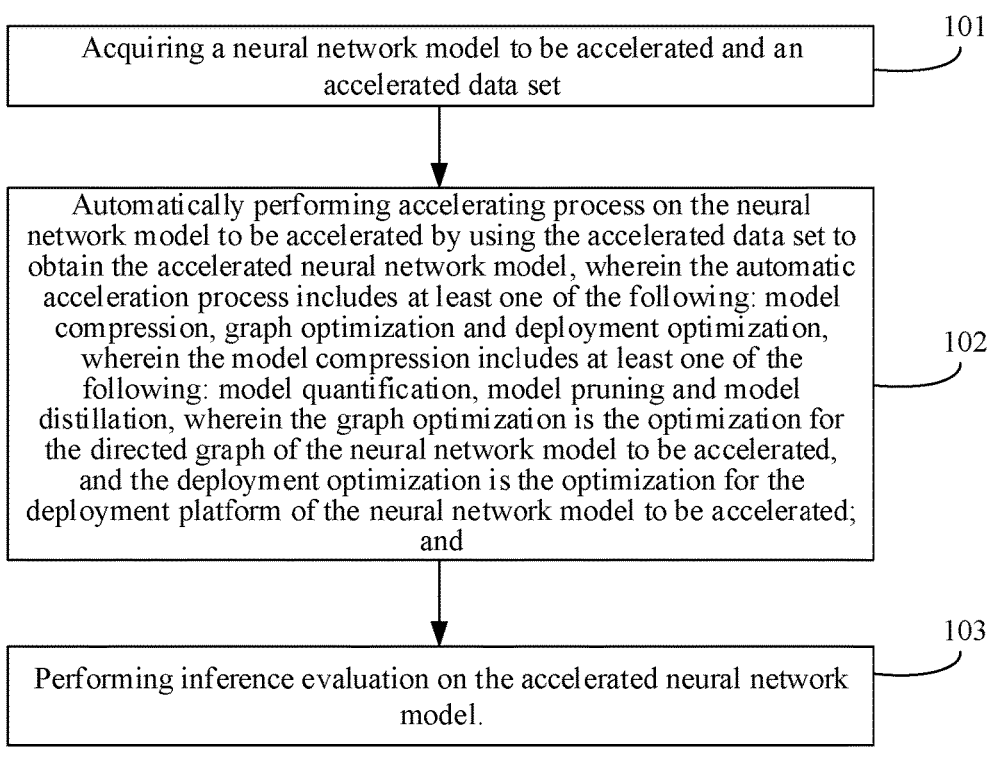

Acquiring a neural network model to be accelerated and an accelerated data set ⟋ 101

Automatically performing accelerating process on the neural network model to be accelerated by using the accelerated data set to obtain the accelerated neural network model, wherein the automatic acceleration process includes at least one of the following: model compression, graph optimization and deployment optimization, wherein the model compression includes at least one of the following: model quantification, model pruning and model distillation, wherein the graph optimization is the optimization for the directed graph of the neural network model to be accelerated, and the deployment optimization is the optimization for the deployment platform of the neural network model to be accelerated; and ⟋ 102

Performing inference evaluation on the accelerated neural network model. ⟋ 103

FIG. 1

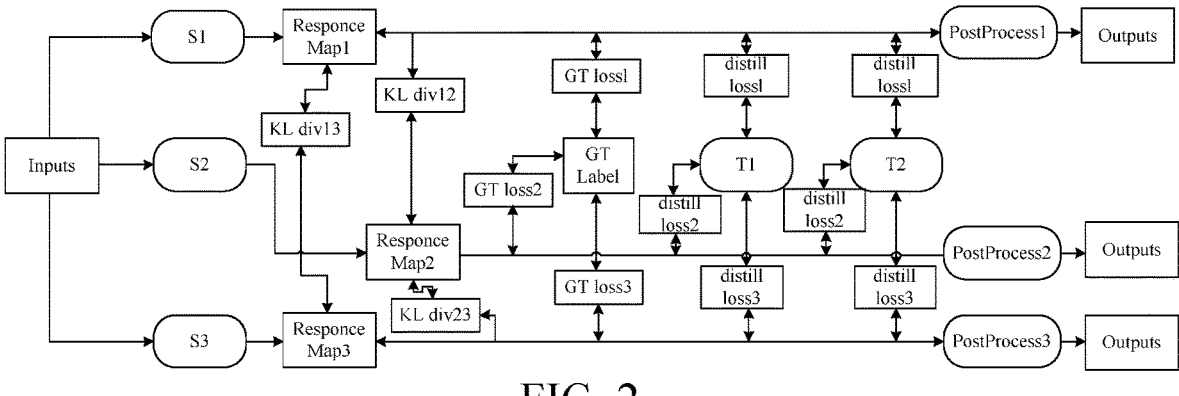

FIG. 2

Data: age (786), gender (604, 3-60 years), smile (417):

P100

|  | PyTorch | TensorRT |
|---|---|---|
| acc_age | 0.83333 | 0.83333 |
| acc_gender | 0.95868 | 0.95868 |
| acc_smile | 0.96643 | 0.96643 |
| avg_time | 14.94 | 3.24 |
| avg_FPS | 66.94 | 308.83 |

GTX2060

|  | PyTorch | TensorRT |
|---|---|---|
| acc_age | 0.83333 | 0.83333 |
| acc_gender | 0.95868 | 0.95868 |

FIG. 5

| | |
|---|---|
| Quantizing the target detection model to obtain the quantized target detection model, wherein the decoupling head of the target detection model includes at least N detection frame regression branches, wherein N is a natural number between 2 and C, and C is the number of detection categories. | 601 |

| | |
|---|---|
| Acquiring an image to be detected, and performing image preprocessing on the image to be detected, wherein the image preprocessing includes at least one of the following: decoding conversion processing and normalization processing | 602 |

| | |
|---|---|
| Using the quantized target detection model to detect the image to be detected; and | 603 |

| | |
|---|---|
| Performing Non-Maximum Suppression | 604 |

FIG. 6

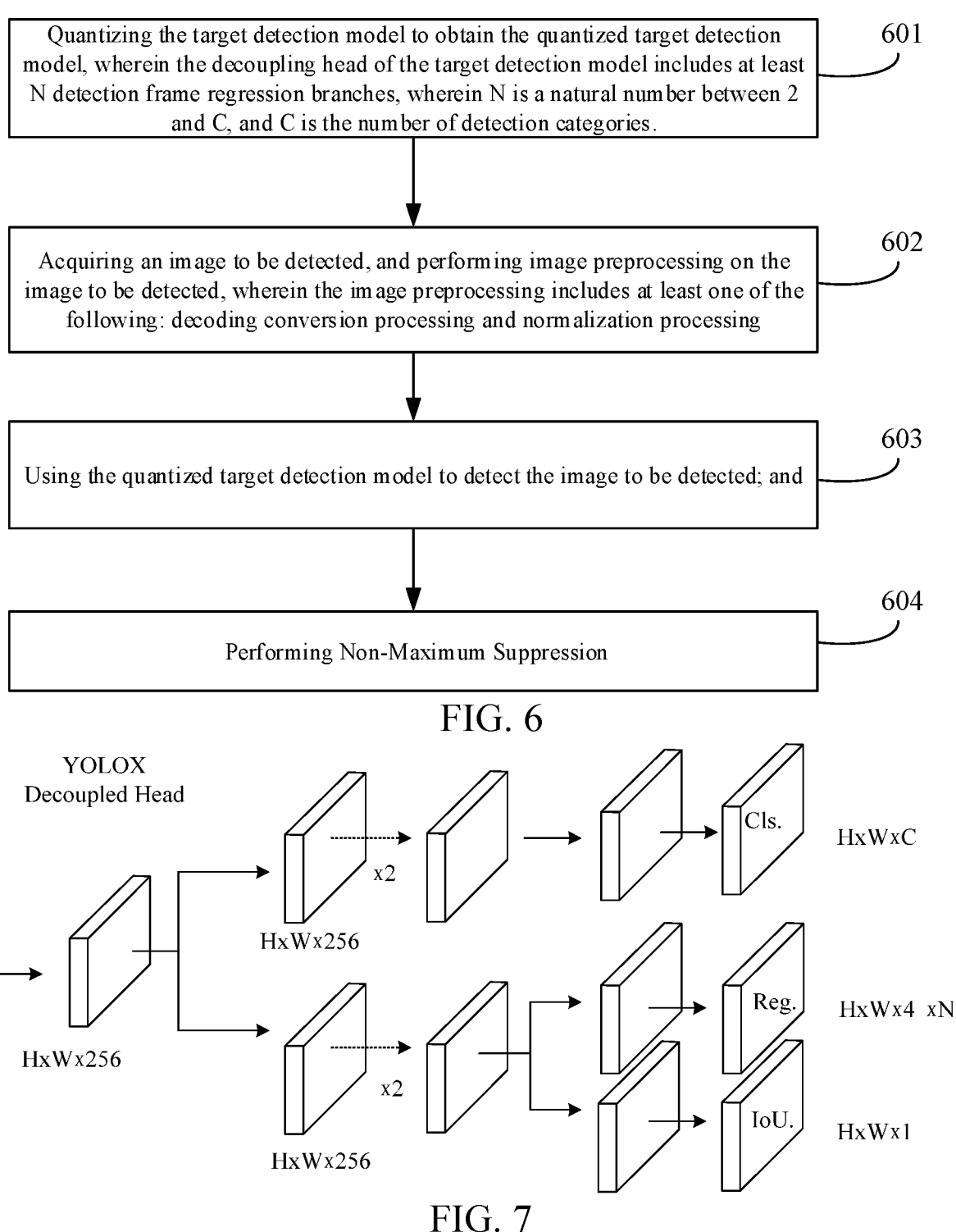

YOLOX
Decoupled Head

HxWx256

HxWx256

HxWx256 x2 x2

Cls.      HxWxC

Reg.      HxWx4 xN

IoU.      HxWx1

FIG. 7

NEURAL NETWORK INFERENCE ACCELERATION METHOD, TARGET DETECTION METHOD, DEVICE, AND STORAGE MEDIUM

CROSS-REFERENCE TO RELATED APPLICATIONS

This application is a national stage application of PCT Application No. PCT/CN2023/071511, which is filed on Jan. 10, 2023 and claims priority of Chinese Patent Application No. 202210168811.7, filed to the CNIPA on Feb. 23, 2022 and entitled "Neural Network Inference Acceleration Method, Target Detection Method, Device, and Storage Medium", the content of which should be regarded as being incorporated herein by reference.

TECHNICAL FIELD

The embodiment of the present disclosure relates to, but is not limited to, the technical field of intelligent systems, in particular to a neural network inference acceleration method, a target detection method, a device and a storage medium.

BACKGROUND

Nowadays, with the rapid development of the Internet and the arrival of the era of big data, Deep Neural Networks (DNN) has also developed rapidly. In the deep neural networks, a large number of multi-dimensional feature vectors are input, and the output results are obtained after being weighted by matrix weights of multiple middle layers. The output results are used for regression calculation or regression classification.

In recent years, deep neural networks algorithm is increasingly used in the application of edge nodes, including automatic driving system, augmented reality, embedded computer vision and so on. However, the model structure of deep neural networks is huge and complex, which requires large-scale data for optimal training of the model parameters. How to compress and accelerate the model of deep neural networks to meet the needs of intelligent and real-time application of edge nodes has become a hot issue in the field of deep learning.

SUMMARY

The following is a summary of subject matters described herein in detail. The summary is not intended to limit the protection scope of claims.

An embodiment of the present disclosure provides a neural network inference acceleration method, including: acquiring a neural network model to be accelerated and an accelerated data set; automatically performing accelerating process on the neural network model to be accelerated by using the accelerated data set to obtain the accelerated neural network model, wherein the accelerating process includes at least one of the following: model compression, graph optimization and deployment optimization, wherein the model compression includes at least one of the following: model quantification, model pruning and model distillation, wherein the graph optimization is the optimization for the directed graph of the neural network model to be accelerated, and the deployment optimization is the optimization for the deployment platform of the neural network model to be accelerated; and performing inference evaluation on the accelerated neural network model.

In some exemplary embodiments, the method further includes: receiving a first input from a user, the first input includes at least one of:

the minimum execution accuracy of the accelerated neural network model;

the minimum execution speed of the accelerated neural network model;

the lowest model compression ratio of the accelerated neural network model; and the type of the neural network model to be accelerated.

In some exemplary embodiments, the method further includes: outputting at least one of:

the accelerated neural network model;

the deployment platform;

software and hardware resources of the deployment platform; and categories and sub-categories of the accelerating process.

In some exemplary embodiments, the deployment optimization includes at least one of the following:

according to the category of deployment platform, selecting the corresponding model acceleration tool to accelerate the model; and according to the software and hardware resources of the current deployment platform, selecting the corresponding software and hardware optimization strategy.

In some exemplary embodiments, the software and hardware optimization strategy includes at least one of the following: parallel thread optimization, hardware built-in mapping optimization, loop optimization, memory allocation reading optimization, and memory latency hiding optimization.

In some exemplary embodiments, when the corresponding software and hardware optimization strategy is selected according to the software and hardware resources of the current deployment platform, the method further includes:

searching the software and hardware resources of the current deployment platform; and representing the software and hardware resources of the deployment platform by parameters, and evaluating the performance of the parameters by using a cost function.

In some exemplary embodiments, the graph optimization includes at least one of:

eliminating unnecessary nodes;

replacing a more costly operator with a less costly operator;

fusing successive operators into one operator;

eliminating the calculated expression and using the calculated value as a replacement; and eliminating dead code.

In some exemplary embodiments, when model distillation is performed on the neural network model to be accelerated, acquiring at least two teacher models, copying the neural network model to be accelerated into multiple student models, training the multiple student models and the teacher models, and selecting the optimal student model as the distilled neural network model.

In some exemplary embodiments, when training the multiple student models and the teacher models, synchronously calculating three kinds of loss information in each iteration process, and feeding back to the multiple student models through a back propagation algorithm after adding the three kinds of loss information; the three types of loss information include:

real loss information obtained by comparing an output of each of the student models with a GroundTruth label;

distill loss information obtained by comparing an output of each of the student models with an output of multiple the teacher models; and scatter loss information obtained by comparing the outputs of the multiple student models with each other.

In some exemplary embodiments, the accelerated data set includes a quantization calibration image set and a quantization test image set, using the accelerated data set to perform model quantification on the neural network model to be accelerated, includes:

quantizing the first neural network model by using the quantization calibration image set to obtain a second neural network model, wherein the numerical accuracy of the second neural network model is less than the numerical accuracy of the first neural network model;

testing model accuracy of the second neural network model by using the quantization test image set, when the model accuracy of the second neural network model does not reach the preset model accuracy threshold, changing the quantization strategy, and re-quantizing the first neural network model by using the changed quantization strategy and the quantization calibration image set until the model accuracy of the quantized second neural network model reaches the preset model accuracy threshold.

In some exemplary embodiments, the model accuracy of the second neural network model reaching a preset model accuracy threshold includes:

the execution accuracy of the second neural network model is greater than or equal to the preset execution accuracy;

the execution speed of the second neural network model is greater than or equal to a preset execution speed threshold; and the model compression ratio of the second neural network model is greater than or equal to a preset model compression ratio threshold.

In some exemplary embodiments, the changing of quantization strategy includes any one or more of the following: changing a quantization threshold algorithm, starting a hybrid numerical accuracy calculation.

An embodiment of the disclosure further provides a neural network inference acceleration device, including a memory; and a processor coupled to the memory, the processor is configured to, based on instructions stored in the memory, perform the steps of the above neural network inference acceleration method.

An embodiment of the disclosure further provides a storage medium, on which a computer program is stored, and when the program is executed by a processor, the above neural network inference acceleration method is achieved.

An embodiment of the disclosure further provides a target detection method, which includes the following steps:

quantizing the target detection model to obtain the quantized target detection model, wherein the decoupling head of the target detection model includes at least N detection frame regression branches, wherein N is a natural number between 2 and C, and C is the number of detection categories;

acquiring an image to be detected, and performing image preprocessing on the image to be detected, wherein the image preprocessing includes at least one of the following: decoding conversion processing and normalization processing;

using the quantized target detection model to detect the image to be detected; and processing the detection results with non-maximum suppression.

In some exemplary embodiments, the quantizing of the target detection model includes:

quantizing the first neural network model by using the quantization calibration image set to obtain a second neural network model, wherein the numerical accuracy of the second neural network model is less than the numerical accuracy of the first neural network model;

testing model accuracy of the second neural network model by using the quantization test image set, when the model accuracy of the second neural network model does not reach the preset model accuracy threshold, changing the quantization strategy, and re-quantizing the first neural network model by using the changed quantization strategy and the quantization calibration image set until the model accuracy of the quantized second neural network model reaches the preset model accuracy threshold.

An embodiment of the disclosure further provides a target detection device, including a memory; and a processor coupled to the memory, the processor is configured to, based on instructions stored in the memory, perform the steps of the above target detection method.

An embodiment of the disclosure further provides a storage medium, on which a computer program is stored, and when the program is executed by a processor, the above target detection method is achieved.

Other aspects may be comprehended upon reading and understanding of the drawings and detailed description.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of various components in the drawings do not reflect actual scales, but are intended to schematically illustrate contents of the present disclosure.

FIG. 1 is a schematic flowchart of a neural network inference acceleration method according to an exemplary embodiment of the present disclosure.

FIG. 2 is a schematic flowchart of a model distillation method according to an exemplary embodiment of the present disclosure.

FIG. 5 is a schematic diagram of an inference result of a neural network inference acceleration method on two servers according to an exemplary embodiment of the present disclosure.

FIG. 6 is a schematic flowchart of a target detection method according to an exemplary embodiment of the present disclosure.

FIG. 7 is a schematic diagram of a structure of a detection head of a target detection model according to an exemplary embodiment of the present disclosure.

DETAILED DESCRIPTION

Figure 3:
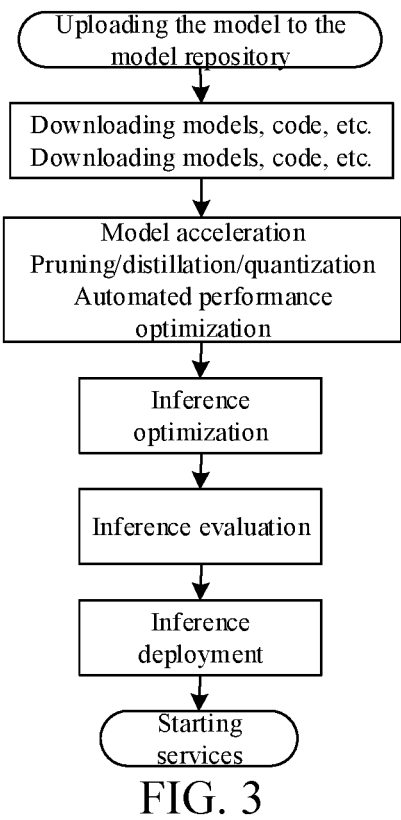
FIG. 3 is another schematic flowchart of a neural network inference acceleration method according to an exemplary embodiment of the present disclosure.

To make objectives, technical solutions, and advantages of the present disclosure more clear, the embodiments of the present disclosure will be described in detail with reference to the accompanying drawings. It is to be noted that the embodiments in the present disclosure and features in the embodiments may be randomly combined with each other if there is no conflict.

Unless otherwise defined, technical terms or scientific terms used in the embodiments of the present disclosure should have usual meanings understood by those of ordinary skills in the art to which the present disclosure belongs. "First", "second", and similar terms used in the embodiments of the present disclosure do not represent any order, quantity, or importance, but are used for distinguishing different components. "Include", "contain", or a similar term means that an element or article appearing before the term covers an element or article and equivalent thereof listed after the term, and other elements or articles are not excluded.

In recent years, deep neural networks algorithm is increasingly used in the application of edge nodes, including automatic driving system, augmented reality, embedded computer vision and so on. However, the model structure of deep neural networks is huge and complex, which requires large-scale data for optimal training of the model parameters. How to compress and accelerate the model of deep neural networks to meet the needs of intelligent and real-time application of edge nodes has become a hot issue in the field of deep learning.

As shown in FIG. 1, an embodiment of the present disclosure provides a neural network inference acceleration method, including:

Step 101, acquiring a neural network model to be accelerated and an accelerated data set;

Step 102, automatically performing accelerating process on the neural network model to be accelerated by using the accelerated data set to obtain the accelerated neural network model, wherein the automatic acceleration process includes at least one of the following: model compression, graph optimization and deployment optimization, wherein the model compression includes at least one of the following: model quantification, model pruning and model distillation, wherein the graph optimization is the optimization for the directed graph of the neural network model to be accelerated, and the deployment optimization is the optimization for the deployment platform of the neural network model to be accelerated; and Step 103, performing inference evaluation on the accelerated neural network model. The neural network inference acceleration method according to the embodiment of the present disclosure can adopt the pipeline automation method to improve the efficiency of artificial intelligence inference acceleration through the automatic accelerating process of the neural network model to be accelerated, and adopt the optimization method of at least one of model compression, graph optimization and deployment optimization to improve the multiple of inference acceleration, which may be applied to the environment of artificial intelligence platform, edge computing platform and the like.

In some exemplary embodiments, the method further includes: receiving a first input from a user, wherein, the first input includes at least one of:

minimum execution accuracy of the accelerated neural network model;

minimum execution speed of the accelerated neural network model;

lowest model compression ratio of the accelerated neural network model; and type of the neural network model to be accelerated.

In this embodiment, when the first input of the user includes the minimum execution accuracy of the accelerated neural network model, the minimum execution speed of the accelerated neural network model and the lowest model compression ratio of the accelerated neural network model at the same time, the minimum execution accuracy, the minimum execution speed and the lowest model compression ratio in the first input may be taken as the model accuracy required to be achieved by the accelerated neural network model.

When any one of the minimum execution accuracy of the accelerated neural network model, the minimum execution speed of the accelerated neural network model and the lowest model compression ratio of the accelerated neural network model is not included in the first input of the user, the preset execution accuracy, the preset execution speed threshold and the preset model compression ratio threshold may be used as the model accuracy required to be achieved by the accelerated neural network model.

When the first input of the user includes one or two of the minimum execution accuracy of the accelerated neural network model, the minimum execution speed of the accelerated neural network model and the lowest model compression ratio of the accelerated neural network model, the model accuracy required to be achieved by the accelerated neural network model may be defined by the input value of the user's first input and the preset model accuracy threshold value together. For example, assuming that the user's first input includes the minimum execution accuracy of the accelerated neural network model, the minimum execution accuracy included in the user's first input, the preset execution speed threshold value and the preset model compression ratio threshold value will be used as the model accuracy required to be achieved by the accelerated neural network model.

In the present embodiment, the first input of the user may also include the type of the neural network model to be accelerated, for example, the type of the neural network model to be accelerated may be "face recognition". In this case, multiple face recognition neural network models may be acquired, and the multiple face recognition neural network models may be inferred and accelerated according to the model accuracy required by the user or the preset model accuracy, and one or more face recognition neural network models meeting the preset or designated model accuracy requirements are output.

In some exemplary embodiments, the accelerated data set includes calibration data and test data, etc., wherein the calibration data is a set of samples for training, mainly used to train parameters of the neural network model during accelerating process. The test data are used to judge the model accuracy of the trained neural network model.

In some exemplary embodiments, the method further includes:

acquiring automation acceleration script;

parsing the automation acceleration script and generating the automation acceleration process.

The neural network model to be accelerated is automatically accelerated by using the accelerated data set, specifically, according to the automatic acceleration flow, the neural network model to be accelerated is automatically accelerated by using the accelerated data set.

In some exemplary embodiments, automated acceleration scripts may be used to acquire categories and sub-categories of the accelerating process that the user wants to use (e.g. whether model compression is required; during model compression, whether only model quantification is performed or whether model quantification, model pruning and model distillation is performed; whether graph optimization is required and which graph optimization method is required; whether deployment optimization is required and which deployment optimization method is required, etc.), obtain the user's deployment platform, obtain the hardware and software resource configuration of the user's deployment platform, etc. An embodiment generates an automatic acceleration flow through parsing an automatic acceleration script, and then performs automatic accelerating process on a neural network model to be accelerated according to the automatic acceleration flow. The pipeline automation method may be adopted to improve the efficiency of artificial intelligence inference acceleration, and the optimization method of at least one of model compression, graph optimization and deployment optimization may be adopted to improve the multiple of inference acceleration. The inference acceleration method may be applied to an artificial intelligence platform, an edge computing platform and other environments.

In other exemplary embodiments, the automated acceleration script may also be used to acquire a neural network model to be accelerated and an accelerated data set etc.

In other exemplary embodiments, when the user does not provide a specific neural network model to be accelerated (exemplary, the user may provide the type of neural network model to be accelerated as a face recognition model), and does not provide the category and sub-category of accelerating process to be used, the deployment platform and the software and hardware resource configuration of the deployment platform, the neural network inference acceleration method of the embodiment of the present disclosure can adopt traversal method. For example, acquiring multiple face recognition models (assuming there are 5 types of face recognition models), acquiring various categories and sub-categories of accelerating process, acquiring various possible deployment platforms (assuming there are 6 possible deployment platforms), acquiring various possible software and hardware resource configurations (assuming there are 7 possible software and hardware resource configurations), respectively performing automatic accelerating process on the combinations of various face recognition models, accelerating process categories and sub-categories, deployment platforms and software and hardware resource configurations to obtain model accuracy achieved by accelerated neural network models under various combinations, and output combinations meeting preset or designated model accuracy requirements to users for selection.

In other exemplary embodiments, when the user does not provide a specific neural network model to be accelerated (exemplary, the user may provide the type of neural network model to be accelerated as a face recognition model), and does not provide the category and sub-category of accelerating process to be used, the deployment platform and the software and hardware resource configuration of the deployment platform, the neural network inference acceleration method of the embodiment of the present disclosure can adopt traversal strategy search method, to find a combination that meets the preset or specified model accuracy requirements (which neural network model+which accelerating process category and sub-category+which deployment platform+which hardware and software resource configuration), and output it to the user for selection. As an example, the loss function "loss" may be constructed, and the loss functions under different combinations may be calculated, and the combination with the lowest loss function or several combinations with lower loss function may be output to the user for selection.

In some exemplary embodiments, deployment optimization includes at least one of the following:

according to the category of deployment platform, selecting the corresponding model acceleration tool to accelerate the model; and according to the software and hardware resources of the current deployment platform, selecting the corresponding software and hardware optimization strategy.

Exemplary, the categories of deployment platforms may include: Advanced RISC Machines (ARM) mobile terminals or terminals, Intel central processing unit (CPU), NVIDIA Graphics Processing Unit (GPU), Artificial Intelligence (AI) chip manufacturers, etc. When the deployment platform is ARM mobile terminal or terminal, Mobile Neural Network (MNN) and/or TVM (Tensor Virtual Machine) may be selected for model acceleration; when the deployment platform is Intel CPU, OpenVINO (Open Visual Inference & Neural Network Optimization) and/or TVM may be selected for model acceleration; when the deployment platform is NVIDIA GPU, TensorRT/or TVM may be selected for model acceleration; when the deployment platform uses the AI chip of a specific AI chip manufacturer, the acceleration library of the specific AI chip manufacturer may be selected for model acceleration.

It should be noted that for large-scale deployment application scenarios, some acceleration libraries (such as TensorRT) need inference acceleration on deployed devices/platforms.

MNN is a lightweight deep learning terminal-side inference engine, which solves the problem of terminal-side inference of a deep neural network model, covering optimization, conversion and inference of the deep neural network model. MNN is responsible for loading the network model, inference and predicting to return relevant results. The whole inference process may be divided into model loading and analysis, scheduling of computational graphs, and running efficiently on heterogeneous backend. MNN has the following characteristics:

(1) Universality: support Tensorflow (an open source, Python-based machine learning framework), Convolutional Architecture for Fast Feature Embedding, Caffe), Open Neural Network Exchange (ONNX) and other mainstream model file formats, and support Convolutional Neural Networks (CNN), Rerrent Neural Network (RNN), Generative Adversarial Networks (GAN) and other common networks;

(2) Lightweight: deep customization and tailoring according to the characteristics of terminal-side devices, without any dependence, and may be easily deployed to mobile devices and various embedded devices.

(3) High performance: it does not rely on any third-party computing library, but relies on a large number of handwritten assemblers to achieve core operations, giving full play to the computing power of ARMCPU.

(4) Ease of use: it has perfect documents and examples, and has an efficient image processing module, covering common deformation, conversion and other requirements. Support callback mechanism, which is convenient to extract data or control the running direction.

OpenVINO is an open source commercial free Software Development Kit (SDK) released by Intel to accelerate the derivation and calculation of neural network model. In most cases, it can save a NVIDIA graphics card by optimizing the derivation and calculation of neural network.

TensorRT is a high-performance deep learning inference optimizer, which can provide low latency and high throughput deployment inference for deep learning applications. TensorRT may be used for inference acceleration of ultra-large data centers, embedded platforms or autonomous driving platforms. TensorRT can now support almost all deep learning frameworks, such as TensorFlow, Caffe, Mxnet (a deep learning library), Pytorch (an open source Python (a computer programming language) machine learning library, Torch (a scientific computing boxwork that widely supports machine learning algorithms), and is used for natural language processing and other applications). Combining TensorRT and NVIDIA GPU, it can perform fast and efficient deployment inference in almost all frameworks.

TVM is an automatic code generation method for deep learning proposed by Chen Tianqi, a Ph.D. student at Washington University. This technology can automatically generate deployment optimization code for most computing hardware, and its performance may be compared with the optimization computing library provided by the best vendors at present, and it can adapt to the new dedicated accelerator backend. TVM implements a unified software stack for different deep learning frameworks and hardware platforms, and deploys deep learning models under different frameworks to hardware platforms as efficiently as possible.

To sum up, MNN is more suitable for model acceleration on ARM mobile terminal or terminal; TensorRT is dedicated to model acceleration on NVIDIA GPU; OpenVINO is more suitable for model acceleration on Intel CPU; TVM is a deep learning compiler, which can adapt to the above situations.

The AI chip acceleration library is specially accelerated for a certain AI chip. Exemplary, the AI chip acceleration library can include: RKNN, Questcore, Junzheng acceleration library, BMNNSDK, etc. Among them, RKNN is specially used for Rockchip (a digital audio and video processing chip company) embedded Neural-network Processing Unit (NPU) chip; Questcore is specially used for AI chips of Yitu Technology (a network technology company); Junzheng Acceleration Library is specially used for the intelligent video chip of Beijing Junzheng (an integrated circuit company); BMNNSDK (BitMain Neural Network SDk) is specially used for AI chips of Computing Energy Technology (a technology company). It should be noted that in actual use, the categories of selected deployment platforms are not limited to the types listed above, and this disclosure is not limited to this.

According to the inference acceleration method of the embodiment of the present disclosure, an automatically set "automatic configuration" is selected by default according to the current resource situation, and a corresponding model acceleration tool is selected for model acceleration. The "automatic configuration" may include:

(1) if ARM mobile terminal or terminal exists in the current inference acceleration system, MNN and TVM are automatically selected;

(2) if NVIDIA GPU exists in the current inference acceleration system, OpenVINO and TVM are automatically selected;

(3) if Rockchip NPU chip exists in the current inference acceleration system, RKNN is automatically selected;

(4) if the AI chip of a specific manufacturer exists in the current inference acceleration system, the AI chip acceleration library of the specific manufacturer is selected for acceleration.

If the user manually sets "automatic configuration" according to actual needs, the corresponding model acceleration tool is preferentially selected according to the user's setting for model acceleration.

In some exemplary embodiments, it is possible to determine whether an ARM mobile terminal/terminal, an Intel CPU, a Rockchip NPU chip or an AI chip of a specific manufacturer exists in the system by calling the operating system API to obtain hardware information.

Exemplary, the function format for calling the operating system API is as follows:

Void GetCpuInfo (CString & chProcessorName, CString & chProcessorType, DWORD & dwNum, DWORD & dwMaxClockSpeed).

In some exemplary embodiments, the software and hardware optimization strategy includes at least one of the following: parallel thread optimization, hardware built-in mapping optimization, loop optimization, memory allocation reading optimization, and memory latency hiding optimization.

In some exemplary embodiments, parallel thread optimization may include multi-threaded and single-instruction multi-data SIMD optimization in a CPU, single-instruction multi-threaded SIMT optimization in a GPU, and the like.

In some exemplary embodiments, hardware built-in mapping optimization may include: mapping operators to a built-in efficient Kernel of CPU/GPU/AIcore, etc., for example, the built-in efficient Kernel may be a generic matrix multiplication (GEMM) Kernel.

In some exemplary embodiments, loop optimization may include loop fusion, loop unwrapping, loop reordering and the like.

In some exemplary embodiments, the memory allocation reading optimization may include Shared Memory Space optimization and Local Memory Space optimization in the GPU, etc.

In some exemplary embodiments, the memory latency hiding optimization may include: optimizing the execution pipeline to reduce overall time consumption due to memory latency and the like.

In some exemplary embodiments, when the corresponding software and hardware optimization strategy is selected according to the software and hardware resources of the current deployment platform, the method further includes:

searching the software and hardware resources of the current deployment platform; and representing the software and hardware resources of the deployment platform by parameters, and evaluating the performance of the parameters by using a cost function.

In some exemplary embodiments, the software and hardware resources of the current deployment platform may include: the number of threads in the CPU, configuration of Single Instruction Multiple Data (SIMD), candidate kernel options, selection of circular sorting, configuration of Memory Space, and the like.

In some exemplary embodiments, the cost function is a cost function based on a Gradient Boosting Decision Tree (GBDT) algorithm.

Embodiments of the present disclosure evaluate the performance of different parameters by using a cost function, and for example, a cost function based on a GBDT machine learning algorithm may be used to acquire more accurate performance evaluation.

In some exemplary embodiments, searching for software and hardware resources of the current deployment platform includes:

initializing the search space, for example, the present disclosure can set a larger initial search space for the neural network model, and then automatically fine-tune the initial search space according to the specific software and hardware resources to minimize the search space and reduce the subsequent search time;

conducting searching, for example, a simulated annealing algorithm may be used to optimize the search, and the simulated annealing algorithm can efficiently search for the global optimal value.

When selecting the corresponding software and hardware optimization strategy according to the software and hardware resources of the current deployment platform, the inference acceleration method of the embodiment fully excavates the software and hardware calculation resources based on the automatic performance optimization method for accelerating processing.

In some exemplary embodiments, graph optimization includes at least one of the following:

node optimization: eliminating unnecessary nodes;

algebraic simplification: replacing a more costly operator with a less costly operator;

operator fusion: fusing successive operators into one operator;

generic subexpression elimination: eliminating the expression that has been evaluated and replacing it with the value of the expression that has been evaluated to avoid recalculating elsewhere;

dead code elimination: dead code is usually caused by optimization of other layers.

Generally speaking, the neural network model includes layer and operator layer, in which layer is a layer organized by Graph data structure and its nodes are operators; and operator layer refers to the implementation layer of operators. Operators are usually implemented as functions, and operators are used by function calls.

Exemplary, the form of a convolution operator may be the following format:

```
Intconversion (float * input, float * output, float * kernel,
  intkernel_size, int stride, intpadding_mode) {
  ...
  ...
  }
```

In some exemplary embodiments, when model distillation is performed on the neural network model to be accelerated, acquiring at least two teacher models, copying the neural network model to be accelerated into multiple student models, training the multiple student models and the teacher models, and selecting the optimal student model as the distilled neural network model.

In some exemplary embodiments, when training the multiple student models and the teacher models, synchronously calculating three kinds of loss information in each iteration process, and feeding back to the multiple student models through a back propagation algorithm after adding the three kinds of loss information; the three types of loss information include:

real loss information obtained by comparing an output of each of the student models with a GroundTruth label;

distill loss information obtained by comparing an output of each of the student models with an output of multiple the teacher models; and scatter loss information obtained by comparing the outputs of the multiple student models with each other.

As an example, as shown in FIGS. 2, S1, S2, and S3 represent student models, T1, T2 represent teacher models, GT loss1 represents real loss information between student model 1 and GroundTruth labels (GT Label), GT loss2 represents real loss information between student model 2 and GroundTruth labels, GT loss3 represents real loss information between student model 3 and GroundTruth labels, distill1 represents distill loss information between student model 1 and teacher model 1 and teacher model 2, distill2 represents distill loss information between student model 2 and teacher model 1 and teacher model 2, distill3 represents distill loss information between student model 3 and teacher model 1 and teacher model 2, KL div12 represents divergence loss information between student model 1 and student model 2, KL div13 represents divergence loss information between student model 1 and student model 3, KL div23 represents divergence loss information between student model 2 and student model 3, Reponce Map1 is a response graph of student model 1, Reponce Map2 is a response graph of student model 2, Reponce Map3 is a response graph of student model 3, PostProcess1 is a post-processing of student model 1, PostProcess2 is a post-processing of student model 2, PostProcess3 is a post-processing of student model 3, Inputs are distillation Inputs, and Outputs are distillation Outputs. Compared with the distillation method of single teacher and single student, in the distillation method of the embodiment of the present disclosure, one student model can learn from multiple teacher models, and multiple student models can also learn from each other, which can greatly improve the learning efficiency.

In the embodiment of the present disclosure, when distilling the neural network model to be accelerated, multiple teacher models with large parameters are first trained to be optimal, for example, the teacher model may be a large model based on ResNet50 (a more classical network for image classification, which is implemented in all major frameworks). Then, multiple student models are trained terminal to terminal. In the training process, three kinds of information (loss) are used to make each student model achieve optimal: GroundTruth (GT) loss compared with GroundTruth labels; distill loss obtained by comparing with multiple teacher models; divergence loss information obtained by comparing the student models with each other may be, for example, KL (Kullback-Leibler) divergence loss information. In the training process, the above three losses will be calculated synchronously in each iteration step, and after the calculated three losses are added, they will be uniformly fed back to multiple student models through back propagation (BP) algorithm to achieve more optimized results.

In some exemplary embodiments, the calibration data includes a quantization calibration image set, and the test data includes a quantization test image set, using the calibration data and the test data for model quantification of the neural network model to be accelerated, including:

quantizing the first neural network model using a quantization calibration image set to obtain a second neural network model, the numerical accuracy of which is less than that of the first neural network model (exemplary, the numerical accuracy of the first neural network model may be fp32 (fp32 refers to a data type encoded and stored using 4 bytes (i.e. 32 bits), correspondingly, fp16 hereafter refers to a data type encoded and stored using 2 bytes (i.e. 16 bits)), the numerical accuracy of the second neural network model may be int8 (signed 8-bit integer), which is not limited by this disclosure);

testing model accuracy of the second neural network model by using the quantization test image set, when the model accuracy of the second neural network model does not reach the preset model accuracy threshold, changing the quantization strategy, and re-quantizing the first neural network model by using the changed quantization strategy and the quantization calibration image set until the model accuracy of the quantized second neural network model reaches the preset model accuracy threshold.

In some exemplary embodiments, the model accuracy of the second neural network model reaches a pre-set model accuracy threshold, specifically:

the execution accuracy of the second neural network model is greater than or equal to the preset execution accuracy threshold;

the execution speed of the second neural network model is greater than or equal to a preset execution speed threshold; and the model compression ratio of the second neural network model is greater than or equal to a preset model compression ratio threshold.

In the embodiment of the present disclosure, the execution speed is defined as the average number of inferences per second, such as 200 times per second. Model compression ratio is defined as the ratio of the model size after compression to the model size before compression, such as 0.3.

Because different scenes have different requirements on execution accuracy, the minimum execution accuracy threshold may be prioritized according to the requirements of actual scenes, and the execution speed and model compression ratio may be maximized by the quantization method of the present disclosure. Because of the contradiction between execution accuracy and execution speed and model compression ratio, it is necessary to balance in practical application scenarios, especially in the case of low computing power such as edge computing box. The execution accuracy of target detection may be measured by Mean Average Precision (mAP). The larger the mAP, the higher the accuracy, that is, the higher the accuracy.

In some exemplary embodiments, the changing of quantization strategy includes any one or more of the following: changing a quantization threshold algorithm, starting a hybrid numerical accuracy calculation.

For example, the fp32 model (the first neural network model) is quantized by using a quantization calibration image set. After quantizing to the int8 model (the second neural network model), the quantization test image set is used to test the model accuracy of the int8 model. If the model accuracy does not meet the specified standard, the quantization strategy search is automatically conducted, such as: changing the quantization threshold algorithm (for example, the quantization threshold algorithm can include KLD, ADMM, MinMax, EQ, etc.), starting the hybrid accuracy calculation (the hybrid accuracy calculation can include int8/fp32 hybrid accuracy, int8/fp16 hybrid accuracy, int8/fp32/fp16 hybrid accuracy), etc., and then re-quantizing the fp32 model and testing the model accuracy of the newly obtained int8 model. This cycle continues until the quantized int8 model reaches the optimal execution speed and model compression rate under the specified execution accuracy.

Quantization is usually a mapping process from high bits to low bits, and the quantized objects may be either weight data or activation values. There are many forms of quantization, whether it is mixed quantization or full integer quantization; whether it is single-layer quantization, group quantization or entire network quantization, there is a process of mapping floating-point numbers to integers, and there may be precision loss in this process. For us, what we should do is to control the precision loss in an acceptable range.

MinMax is the simplest quantization method. In fact, MinMax simply maps floating-point numbers directly to the data range of int8. This quantization method mainly focuses on the maximum and minimum values of floating-point range.

KLD quantization uses KL divergence to measure the similarity between two distributions, which is a quantization method for activation values in TensorRT. KLD quantization method attempts to abstract fp32 numerical distribution and int8 numerical distribution into two distributions, update the two numerical distributions with threshold |T|, and measure the similarity of the two distributions with KL divergence. If the KL divergence value is smaller, the more similar the two distributions are, which also shows that the threshold |T| is the best choice.

Alternating Direction Method of Multipliers (ADMM) quantization is a way to optimize functions, which is generally used for optimal solution problems with constraints.

EQ (EasyQuant) quantization is an open source quantization algorithm of DEEP GLINT (an artificial intelligence technology company). The main idea of EQ quantization method is: error accumulation, entire network decision becomes single network decision, cosine similarity is taken as optimization goal, and weight scaling coefficient and activation value scaling coefficient are alternately optimized.

In the embodiment of the present disclosure, when selecting the above-mentioned various quantization algorithms (KLD, ADMM, MinMax, EQ, etc.), an interactive interface is not required, and candidate algorithms are determined internally by the system. The system calls the unit function interface and specifies a data source, such as Start auto quantification (string data source).

Hybrid precision (also known as hyper-precision) computation uses different precision levels in a single operation to achieve computational efficiency without sacrificing precision. In mixed precision, the calculation starts from the half-precision value for fast matrix mathematics operation. But with the calculation of numbers, the machine will store the results with higher accuracy. Using this method, when the application program finishes the calculation, the accumulated results are comparable in accuracy to those obtained by using double-precision algorithm. This technology can speed up traditional double-precision applications by up to 25 times, while reducing the memory, time and power consumption required to run.

In some exemplary embodiments, as shown in FIG. 3, when a user uploads a neural network model to a model repository, the management platform automatically parses a corresponding automation acceleration script, wherein the automation acceleration script includes an acceleration automation configuration (i.e., a pipeline configuration), which includes path information of models, codes, data, mirror images, etc. related to inference acceleration, and which accelerating process method is subsequently used for inference acceleration to generate an automation acceleration flow; the management platform distributes the inference acceleration task to one or more edge nodes, receives the edge node download model of the task (i.e. neural network model uploaded by users), data (including calibration data and test data), code (including automation acceleration script) and container mirror image (the edge node builds and starts the container after downloading the container mirror image), etc., and uses the inference acceleration method specified in the acceleration automation configuration to accelerate the model, optimize the inference and evaluate the inference, and finally deploy the inference and start the service.

Figure 4:
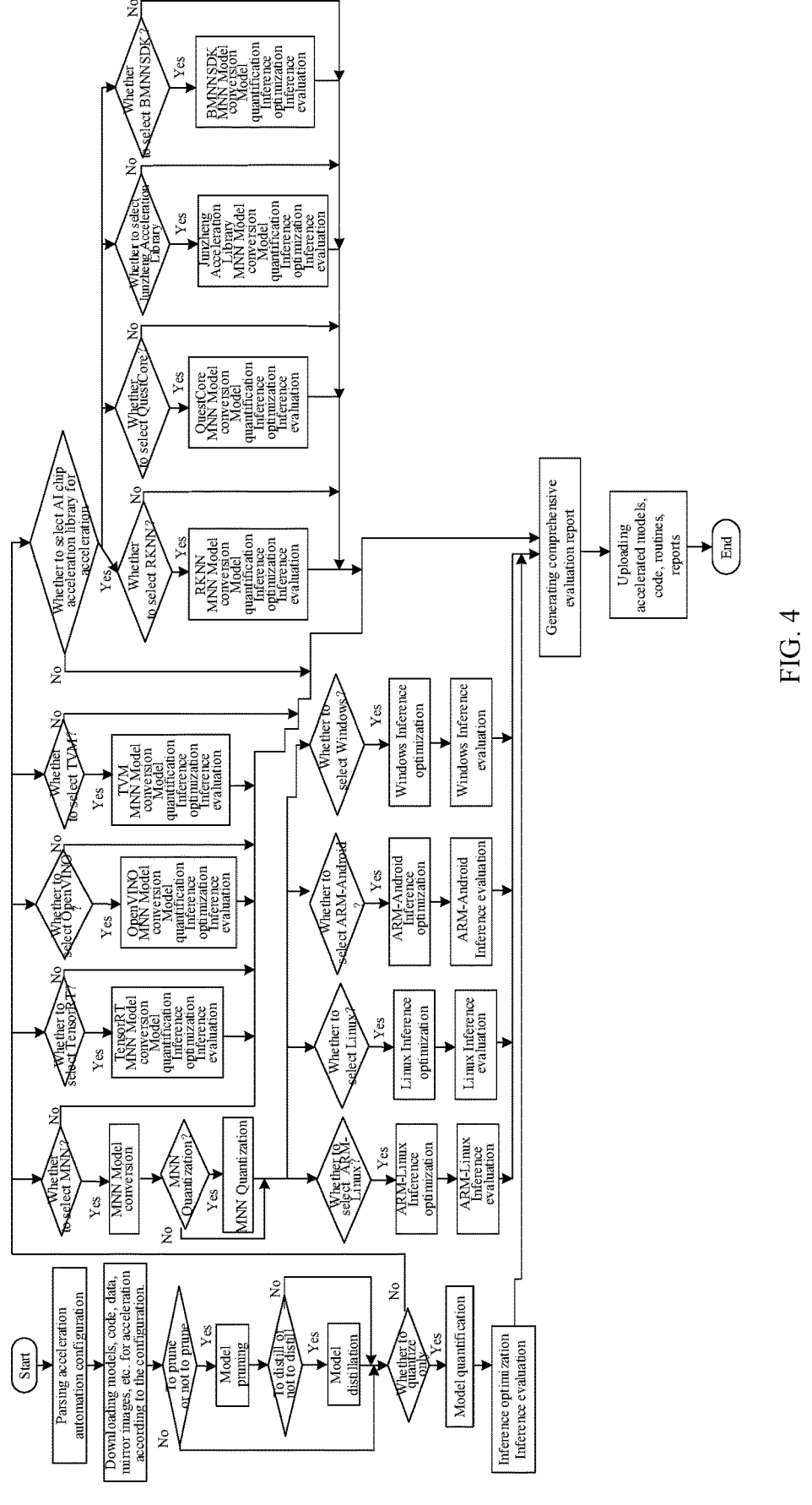
FIG. 4 is another schematic flowchart of a neural network inference acceleration method according to an exemplary embodiment of the present disclosure.

In some exemplary embodiments, as shown in FIG. 4, when the edge node performs model quantification, a corresponding model acceleration tool may be selected for model acceleration according to the category of the deployment platform; then, according to the corresponding CPU architecture, inference optimization and inference evaluation are performed. Of course, direct model quantification, inference optimization and inference evaluation may be performed without choosing the acceleration library or CPU architecture.

In some exemplary embodiments, the categories of deployment platforms may include: ARM (Advanced RISC Machines) mobile terminals or terminals, Intel central processing unit (CPU), NVIDIA (an Artificial Intelligence computing company) Graphics Processing Unit (GPU), Artificial Intelligence (AI) chip manufacturers, etc. When the deployment platform is ARM mobile terminal or terminal, Mobile Neural Network (MNN) and/or TVM (Tensor Virtual Machine) may be selected for model acceleration; when the deployment platform is Intel CPU, OpenVINO (Open Visual Inference & Neural Network Optimization) and/or TVM may be selected for model acceleration; when the deployment platform is NVIDIA GPU, TensorRT/or TVM may be selected for model acceleration; when the deployment platform uses the AI chip of a specific AI chip manufacturer, the acceleration library of the specific AI chip manufacturer may be selected for model acceleration.

In some exemplary embodiments, the CPU architecture may include: ARM Linux, Linux, ARM Android, Windows, etc.

In some exemplary embodiments, the method further includes: outputting including at least one of the following:
    accelerated neural network model;
    deployment platform;
    software and hardware resources of the deployment platform; and
    categories and sub-categories of the accelerating process.

Among them, the categories of accelerating process can include model compression, graph optimization and deployment optimization. When the category of accelerating process is model compression, the sub-categories of accelerating process can include model quantification, model pruning and model distillation. When the category of accelerating process is graph optimization, the sub-category of accelerating process can include eliminating unnecessary nodes, replacing a more costly operator with a less costly operator, fusing successive operators into one operator, eliminating the a calculated expression and using the a calculated value as a replacement; and, eliminating dead code, etc. When the category of accelerating process is deployment optimization, the sub-categories of accelerating process can include:

selecting corresponding model acceleration tools to accelerate the model according to the category of deployment platform; according to the software and hardware resources of the current deployment platform, selecting the corresponding software and hardware optimization strategy. When the sub-category of accelerating process is to select a corresponding model acceleration tool for model acceleration according to the category of the deployment platform, the sub-category may include a first sub-category, which may include: the deployment platform is an ARM mobile terminal or a terminal, and MNN and/or TVM are selected for acceleration; the deployment platform is Intel CPU, and OpenVINO and/or TVM are selected for acceleration; the deployment platform is NVIDIA GPU, and TensorRT/or TVM is selected for acceleration; the deployment platform uses the AI chip of a specific AI chip manufacturer, and selects the acceleration library of the specific AI chip manufacturer for acceleration. When the accelerating process sub-category is to select a corresponding software and hardware optimization strategy according to the software and hardware resources of the current deployment platform, the sub-category may include a second sub-category, which may include parallel thread optimization, hardware built-in mapping optimization, loop optimization, memory allocation reading optimization and memory latency hiding optimization.

In some exemplary embodiments, the method further includes:
    deploying the accelerated neural network model.

In some exemplary embodiments, performing inference evaluation on the accelerated neural network model is, in particular, performing inference evaluation on the deployed neural network model.

FIG. 5 is a schematic diagram of inference results using the inference acceleration method of the embodiment of the present disclosure on two server hosts equipped with GTX2060 (a NVIDIA graphics card model) and P100 GPU (a NVIDIA Tesla P100 graphics processor chip) respectively, wherein, calibration data and test data include three groups, the first group includes 786 age pictures, the second group includes 604 gender pictures, and the third group includes 417 smiling expression pictures. These three groups of data are used for inference evaluation respectively, PyTorch column corresponds to accuracy and speed before acceleration, TensorRT column corresponds to accuracy and speed after acceleration, acc_age, acc_gender and acc_smile data represent inference accuracy of the first group of data, the second group of data and the third group of data respectively; acc is the abbreviation of accuracy, avg_time indicates the average inference time, and avg_FPS indicates the number of picture frames per second inference. It may be seen that by using the inference acceleration method of the embodiment of the present disclosure, the accuracy of the model does not decrease, and the speed is greatly improved.

As shown in FIG. 6, an embodiment of the present disclosure further provides a target detection method, including:
    Step 601, quantizing the target detection model to obtain the quantized target detection model, wherein the decoupling head of the target detection model includes at least N detection frame regression branches, wherein N is a natural number between 2 and C, and C is the number of detection categories;
    Step 602, acquiring an image to be detected, and performing image preprocessing on the image to be detected, wherein the image preprocessing includes at least one of the following: decoding conversion processing and normalization processing;

Step 603, using the quantized target detection model to detect the image to be detected; and Step 604, performing Non-Maximum Suppression (NMS) processing on the detection results The target detection method of the embodiment of the disclosure achieves real-time target detection on an edge computing platform by specially designing a lightweight target detection model aiming at the condition of limited edge computing power, and performing model quantification processing by a specially designed quantification method on the model. In addition, the model lightweight process may be completed more efficiently by performing automatic strategy search on the quantification algorithm, and the automatic iteration of the whole process can reduce the process of manual intervention. The target detection method may be applied to business scenes such as intelligent finance, intelligent park, intelligent transportation and the like.

The target detection model of the embodiment of the present disclosure may be a neural network model to be accelerated in the neural network inference acceleration method, optionally, the target detection model may be accelerated by various accelerating process methods in the neural network inference acceleration method, and the specific accelerating process method may be referred to the foregoing and will not be repeated here.

In some exemplary embodiments, the target detection model may be a Yolox (You Only Look Once X) deep neural network model. Yolox has seven network architectures, including two lightweight networks and five standard networks. Yolox lightweight network includes (1) Yolox-Nano visual network structure diagram; (2) Yolox-Tiny visual network structure diagram. Yolox standard network includes: (1) Yolox-s visual network structure diagram; (2) Yolox-m visual network structure diagram; (3) Yolox-1 visual network structure diagram; (4) Yolox-x visual network structure diagram; (5) Yolox-Darknet 53 visual network structure diagram. Exemplarily, the target detection model may be a Yolox-Tiny lightweight network.

The Yolo (You Only Look Once) deep neural network model acquires images and draws grids composed of different small squares. Then from these small squares, they regress from the squares to predict the offset of the bounding frame they should predict. These mesh cells alone provide us with tens of thousands of possible frames, but Yolo model has anchor frames at the top of the mesh. Anchor frames have different proportions, which enables the model to detect objects of different sizes in different directions.

The combination of these two methods enables the model to detect a wide range of objects, but they also bring about the problem of high computational cost. Another limiting aspect of the Yolo model is the coupling of bounding frame regression and target detection tasks, which leads to some trade-offs.

The Yolox deep neural network model solves these two limitations, and it abandons the construction of anchor frame. This leads to the increase of calculation cost and inference speed. Yolox also decouples the Yolo detection head into a separate feature channel for frame coordinate regression and object classification. This leads to improved convergence speed and model accuracy.

The target detection method of the embodiment of the disclosure improves the accuracy by improving the Yolox detection head, so that the lightweight model Yolox-Tiny can meet the requirements of speed and accuracy at the same time. As shown in FIG. 7, the target detection method of the embodiment of the present disclosure greatly improves the detection accuracy by expanding the number of detection frame regression branches (Reg.) to N, where N is a natural number between 2 and C, and C is the number of detection categories. When N is C, detection frame regression is performed separately for each detection category. When N is less than C, some detection categories share detection frame regression. In actual use, the size of N may be determined according to whether the detection frames of each detection category have commonness. In FIG. 7, Cls. is the classification branch, IoU. is the loss sensing branch, and H and W are the height and width of the detection target respectively.

Figure 8:
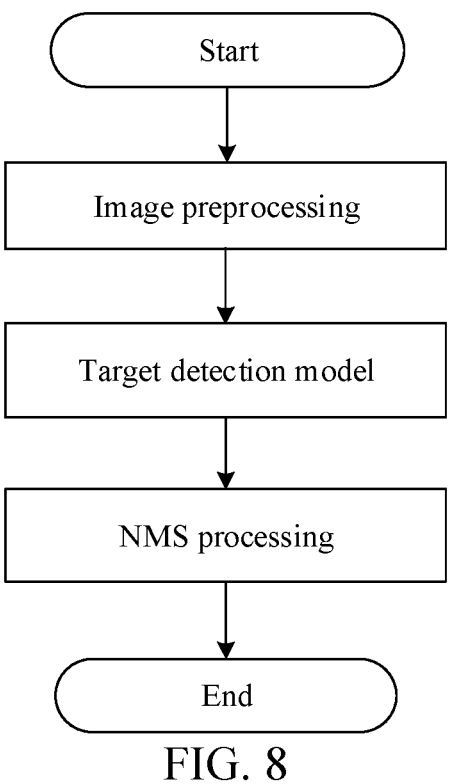
FIG. 8 is a schematic diagram of a process of target detection using a target detection model according to an exemplary embodiment of the present disclosure.

As shown in FIG. 8, when a target detection model is used for target detection, image preprocessing (pre-detection processing), detection by the target detection model, and NMS processing (post-detection processing) are generally included. In this embodiment, the image preprocessing may include at least one of the following: decoding conversion processing, normalization processing.

In some exemplary embodiments, the decoding conversion processing specifically includes: uniformly converting an image to be detected into a 3-channel RGB image, and decoding the input image into an RGB image by the decoding conversion processing when the input image is non-RGB encoded; when an input image is a non-3-channel image, it is converted into a 3-channel image by a decoding conversion process.

In some exemplary embodiments, the normalization processing is used to maintain the image size of a preset scale, and, for example, the image to be detected is uniformly normalized to a width and height of 512×512, and a Padding process is required if necessary to maintain the image scale.

NMS is widely used in many computer vision tasks, such as edge detection, target detection and so on. Here, the application of face detection is taken as an example to illustrate NMS. The core of most face detectors is classifier, that is, given a fixed size picture, the classifier judges whether it is a face or not; the key to evolving a classifier into a detector is to generate windows from multiple scales on the original image, resize them to a fixed size, and then send them to the classifier for judgment. The most common method is to slide the window. Sliding windows will cause many windows to contain or mostly intersect with other windows. So we will use NMS to select the frame with the highest score and suppress those redundant frames. The process of NMS processing is an iteration-traversal-elimination process and, as an example, the process of NMS processing may include:

(1) sorting the scores of all frames and selecting the highest score and its corresponding frame.

(2) Traversing the rest of the frames, and deleting the traversed frame if the overlap area (IOU) between a frame and the current highest frame is greater than a certain threshold.

(3) Continuing to select the one with the highest score from the unprocessed frame and repeating the above process.

In some exemplary embodiments, quantizing the target detection model includes:

quantizing the first neural network model using the quantization calibration image set to obtain a second neural network model whose numerical accuracy is less than that of the first neural network model (illustratively, the numerical accuracy of the first neural network model may be fp32 and the numerical accuracy of the second neural network model may be int8, however this disclosure is not limited);

testing model accuracy of the second neural network model by using the quantization test image set, when the model accuracy of the second neural network model does not reach the preset model accuracy threshold, changing the quantization strategy, and re-quantizing the first neural network model by using the changed quantization strategy and the quantization calibration image set until the model accuracy of the quantized second neural network model reaches the preset model accuracy threshold.

In some exemplary embodiments, the model accuracy of the second neural network model reaches a pre-set model accuracy threshold, specifically:

the execution accuracy of the second neural network model is greater than or equal to the preset execution accuracy threshold;

the execution speed of the second neural network model is greater than or equal to a preset execution speed threshold; and the model compression ratio of the second neural network model is greater than or equal to a preset model compression ratio threshold.

In some exemplary embodiments, when quantifying a model using the model quantification method of the present disclosure, a user may enter or select a desired minimum execution accuracy on an interactive interface; the system automatically quantifies the model to obtain the optimal execution speed and model compression ratio.

In the embodiment of the present disclosure, the execution speed is defined as the average number of inferences per second, such as 200 times per second. Model compression ratio is defined as the ratio of the model size after compression to the model size before compression, such as 0.3.

Because different scenes have different requirements on execution accuracy, the minimum execution accuracy threshold may be prioritized according to the requirements of actual scenes, and the execution speed and model compression ratio may be maximized by the quantization method of the present disclosure. Because of the contradiction between execution accuracy and execution speed and model compression ratio, it is necessary to balance in practical application scenarios, especially in the case of low computing power such as edge computing box. The execution accuracy of target detection may be measured by mAP. The larger the mAP, the higher the accuracy, that is, the higher the accuracy.

In some exemplary embodiments, the changing of quantization strategy includes any one or more of the following: changing a quantization threshold algorithm, starting a hybrid numerical accuracy calculation.

For example, the fp32 model (the first neural network model) is quantized by using a quantization calibration image set. After quantizing to the int8 model (the second neural network model), the quantization test image set is used to test the model accuracy of the int8 model. If the model accuracy does not meet the specified standard, the quantization strategy search is automatically conducted, such as: changing the quantization threshold algorithm (for example, the quantization threshold algorithm can include KLD, ADMM, MinMax, EQ, etc.), starting the hybrid accuracy calculation (the hybrid accuracy calculation can include int8/fp32 hybrid accuracy, int8/fp16 hybrid accuracy, int8/fp32/fp16 hybrid accuracy), etc., and then re-quantizing the fp32 model and testing the model accuracy of the newly obtained int8 model. This cycle continues until the quantized int8 model reaches the optimal execution speed and model compression rate under the specified execution accuracy.

Figure 9:
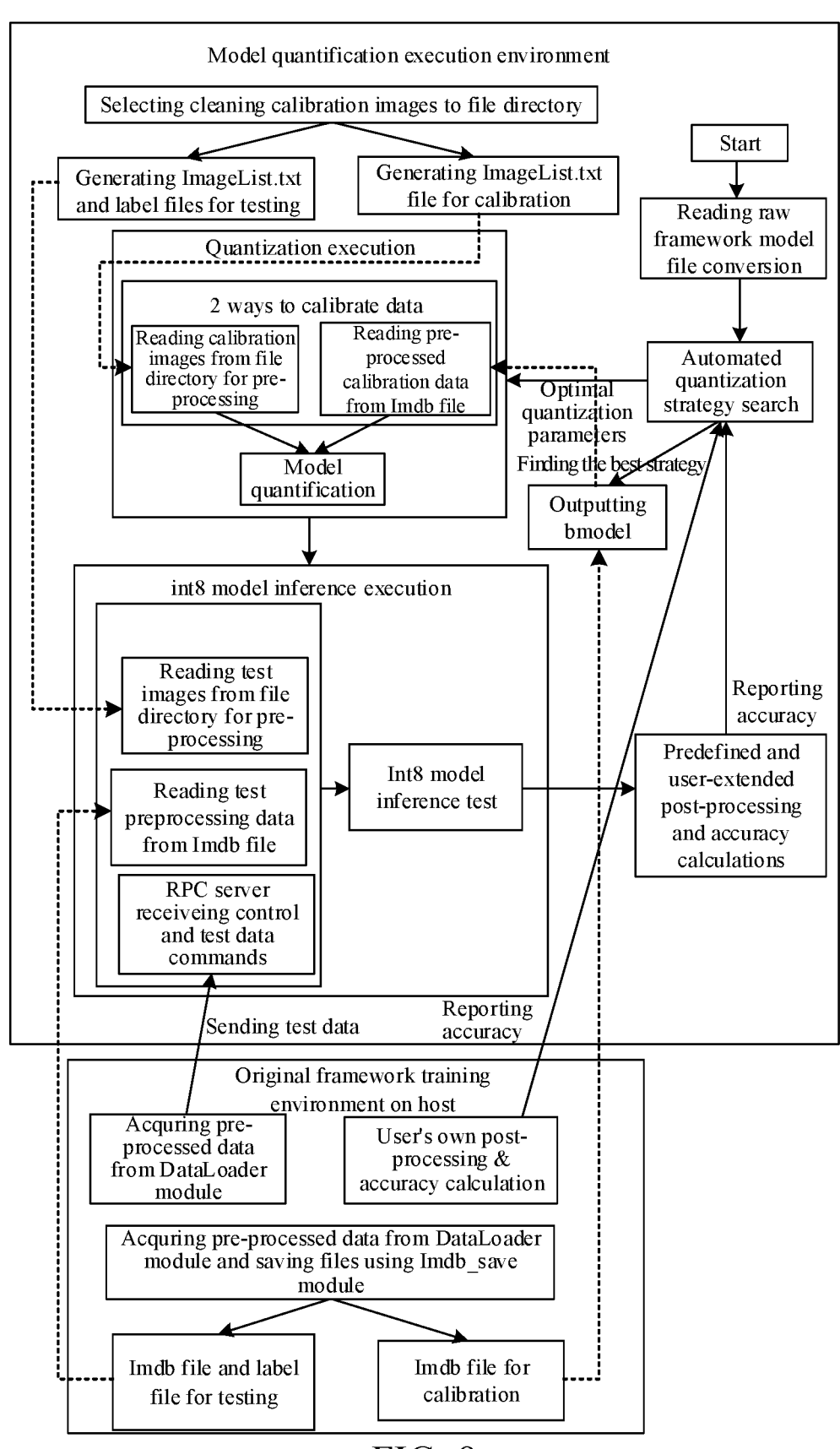
FIG. 9 is a schematic diagram of a process for quantifying a target detection model according to an exemplary embodiment of the present disclosure.
Figure 10:
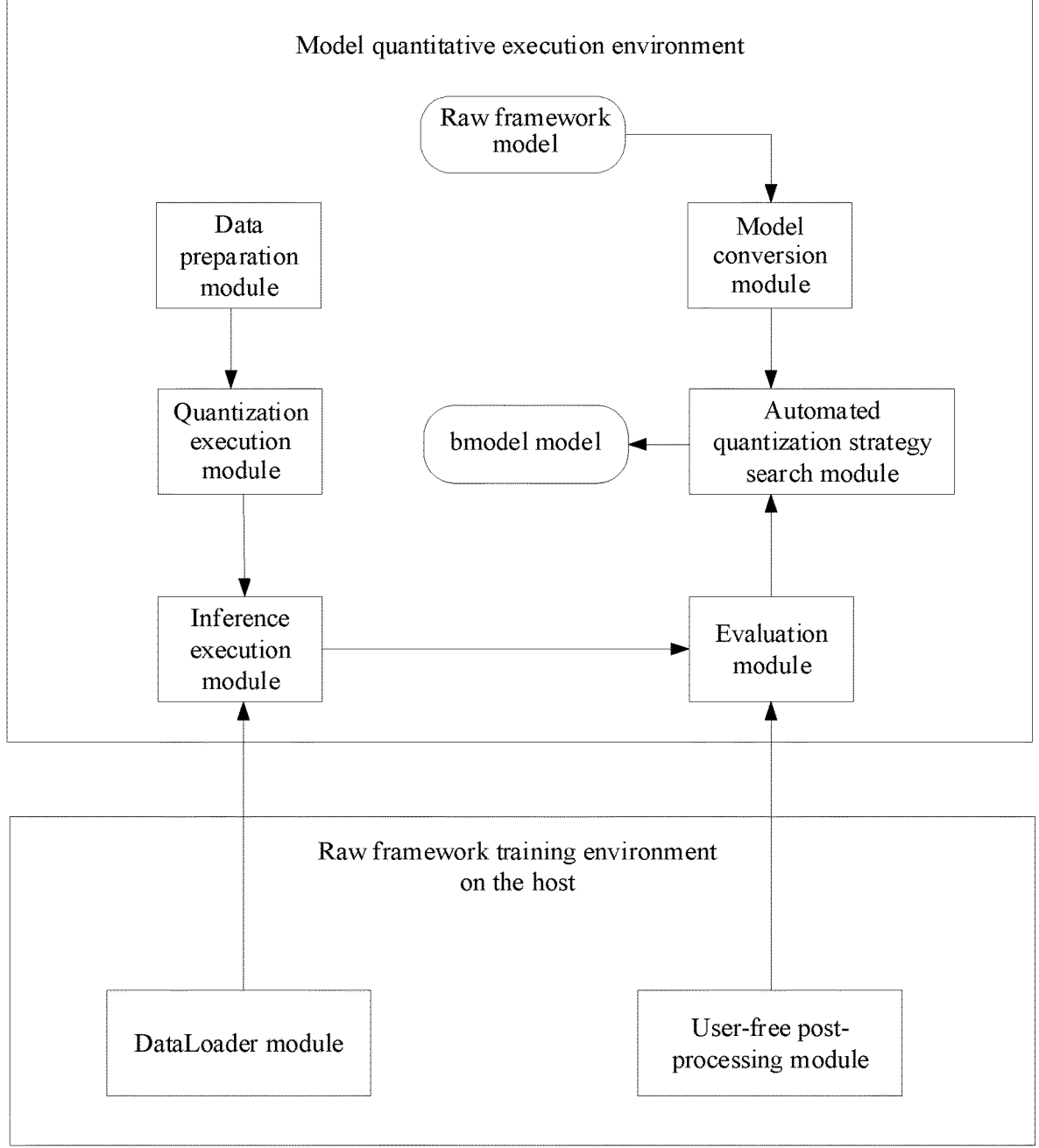
FIG. 10 is a modular schematic diagram of a target detection device according to an exemplary embodiment of the present disclosure.

In some exemplary embodiments, as shown in FIGS. 9 and 10, the overall model quantification flow includes preparation of a quantization calibration image set and a quantization test image set, original framework model conversion, automatic quantization strategy search, quantization execution, int8 model inference execution, post-processing and precision calculation, and reporting.

The format of model files trained by different deep learning frameworks is different. When users learn and use a framework for various reasons, they often find that the application or retraining scene has changed. For example, users have trained an image recognition model with Caffe, but the production environment uses TensorFlow for prediction. Another example is the deep learning development framework based on TensorFlow in an organization, and now there is a deep algorithm project, which needs to be deployed on mobile devices. At this point, we can use model conversion technology to solve this kind of problem. The current model conversion technology includes two kinds of design ideas, one is to directly convert the model from the existing framework to the format suitable for the target framework, which may be called direct conversion technology; the other is to design an open file specification for deep learning, and the mainstream deep learning framework can finally support this specification standard. The representative of this technology is the open neural network switching framework-ONNX technology.

In an embodiment of the present disclosure, when the model accuracy of the current int8 model does not reach the specified model accuracy, an automatic quantization strategy search module is executed, the quantization strategy is changed, and the quantization is re-performed using the changed quantization strategy until the quantized model takes into account the best strategy of model accuracy and execution efficiency, and the quantized model (bmodel) is output. When performing model quantification, the quantization calibration data may be obtained in the following two ways: acquiring from the original frame training environment of the host computer and acquiring from the newly selected calibration picture. In actual use, one of the above two ways of acquiring quantization calibration data may be selected. When int8 model inference is executed, the input test data is obtained in at least one of the following three ways: acquiring from the newly selected test picture, acquiring from the original framework training environment on the host computer, acquiring preprocessing data from the Data_loader (a tool used to process the model input data in pytorch, which combines dataset+sampler, and providing single-threaded or multi-threaded iterative objects on the dataset) module. In actual use, the above three ways of inputting test data may be selected. In an embodiment of the present disclosure, the test data may be directly acquired in the original framework training environment, and then used for int8 model inference execution, and the results are returned to the original framework environment for processing and accuracy calculation.

The data set of Internet Movie Database (IMDB) is Internet movie data, which contains 50,000 seriously polarized comments, and is divided into training set and test set. Positive and negative comments each account for 50%. The dataset is also built into the Keras library, an open source artificial neural network library written by Python. IMDB file structure is simple, a folder, wherein inside there is a data file and a lock file. Data is copied and transmitted at will. It is simple to access, which does not need to run a separate database management process, as long as the IMDB library is referenced in the code that accesses the data, and the file path is given when accessing it.

IMDB save module is for saving IMDB files and label files. The DataLoader module is a tool used in Pytorch to process model input data, which combines dataset+sampler, and provides single-threaded or multi-threaded (num_workers) iterative objects on the dataset.

In the embodiment of the present disclosure, when selecting the above-mentioned various quantization algorithms (KLD, ADMM, MinMax, EQ, etc.), an interactive interface is not required, and candidate algorithms are determined internally by the system. The system calls the unit function interface and specifies a data source, such as Start auto quantification (string data source). Similarly, when starting the blending accuracy calculation, the candidate blending accuracy type is specified by the system without user specification.

An embodiment of the disclosure further provides a neural network inference acceleration device, including a memory; and a processor coupled to the memory, the processor is configured to, based on instructions stored in the memory, perform the steps of the above neural network inference acceleration method.

In one example, a neural network inference acceleration device may include a first processor, a first memory, a first bus system, and a first transceiver, wherein the first processor, the first memory, and the first transceiver are connected through the first bus system, the first memory is for storing instructions, and the first processor is for executing the instructions stored in the first memory to control the first transceiver to transmit signals. Particularly, the first transceiver can acquire a neural network model to be accelerated and an accelerated data set under the control of the first processor, the first processor automatically accelerates the neural network model to be accelerated by using the accelerated data set to obtain the accelerated neural network model, wherein the accelerating process includes at least one of the following: model compression, graph optimization and deployment optimization, wherein the model compression includes at least one of the following: model quantification, model pruning and model distillation, wherein the graph optimization is the optimization for the directed graph of the neural network model to be accelerated, and the deployment optimization is the optimization for the deployment platform of the neural network model to be accelerated; and the first processor performs inference evaluation on the accelerated neural network model.

It should be understood that the first processor may be a Central Processing Unit (CPU), or the first processor may be another general-purpose processor, a digital signal processor (DSP), an application specific integrated circuit (ASIC), a field programmable gate array (FPGA), or another programmable logic device, a discrete gate or a transistor logic device, a discrete hardware component, etc. The general-purpose processor may be a microprocessor, or the processor may be any conventional processor, etc.

The first memory may include a read-only memory and a random access memory, and provides instructions and data to the first processor. A portion of the first memory may also include a non-volatile random access memory. For example, the first memory may also store information of a device type.

Besides a data bus, a first bus system may also include a power bus, a control bus and a status signal bus, etc.

In an implementation process, processing performed by a processing device may be completed through an integrated logic circuit of hardware in the first processor or instructions in a form of software. That is, the steps of the method in the embodiments of the present disclosure may be embodied as executed and completed by a hardware processor, or executed and completed by a combination of hardware in the processor and a software module. The software modules may be located in a storage medium, such as a random access memory, a flash memory, a read-only memory, a programmable read-only memory, an electrically erasable programmable memory, or register. The storage medium is located in the first memory, and the first processor reads information in the first memory and completes the steps of the foregoing methods in combination with its hardware. In order to avoid repetition, detailed description is not provided herein.

An embodiment of the present disclosure further provides a computer storage medium, wherein the computer storage medium stores executable instructions; when the executable instructions are executed by the processor, the neural network inference acceleration method provided by any embodiment of the present disclosure may be achieved; the neural network inference acceleration method may be acquiring a neural network model to be accelerated and an accelerated data set; automatically performing accelerating process on the neural network model to be accelerated by using the accelerated data set to obtain the accelerated neural network model, wherein the accelerating process includes at least one of the following: model compression, graph optimization and deployment optimization, wherein the model compression includes at least one of the following: model quantification, model pruning and model distillation, wherein the graph optimization is the optimization for the directed graph of the neural network model to be accelerated, and the deployment optimization is the optimization for the deployment platform of the neural network model to be accelerated; and inference evaluation is performed on the accelerated neural network model, a pipeline automation method may be used to improve the efficiency of artificial intelligence inference acceleration, and at least one optimization method of model compression, graph optimization and deployment optimization may be used to improve the multiple of inference acceleration, which may be applied to artificial intelligence platform, edge computing platform and other environments. The method of driving neural network inference acceleration by executing executable instructions is basically the same as the neural network inference acceleration method provided by the above embodiments of the present disclosure and will not be described here.

An embodiment of the disclosure further provides a target detection device, including a memory; and a processor coupled to the memory, the processor is configured to, based on instructions stored in the memory, perform the steps of the above target detection method.

In one example, the target detection device may include a second processor, a second memory, a second bus system, and a second transceiver, wherein the second processor, the second memory, and the second transceiver are connected through the second bus system, the second memory is for storing instructions, and the second processor is for executing the instructions stored in the second memory to control the second transceiver to transmit signals. Specifically, the second transceiver can acquire the image to be detected under the control of the second processor, and the second processor performs quantization processing on the target detection model to obtain the quantized target detection model, wherein the decoupling head of the target detection model includes at least N detection frame regression branches, wherein N is a natural number between 2 and C, and C is the number of detection categories; performing image preprocessing on the image to be detected, wherein the image preprocessing includes at least one of the following: decoding conversion processing and normalization processing; using the quantized target detection model to detect the image to be detected; and processing the detection results with non-maximum suppression.

It should be understood that the second processor may be a Central Processing Unit (CPU), or the second processor may be another general-purpose processor, a digital signal processor (DSP), an application specific integrated circuit (ASIC), a field programmable gate array (FPGA), or another programmable logic device, a discrete gate or a transistor logic device, a discrete hardware component, etc. The general-purpose processor may be a microprocessor, or the processor may be any conventional processor, etc.

The second memory may include a read-only memory and a random access memory, and provides instructions and data to the second processor. A portion of the second memory may also include a non-volatile random access memory. For example, the second memory may also store information of a device type.

Besides a data bus, a second bus system may also include a power bus, a control bus and a status signal bus, etc.

In an implementation process, processing performed by a processing device may be completed through an integrated logic circuit of hardware in the second processor or instructions in a form of software. That is, the steps of the method in the embodiments of the present disclosure may be embodied as executed and completed by a hardware processor, or executed and completed by a combination of hardware in the processor and a software module. The software modules may be located in a storage medium, such as a random access memory, a flash memory, a read-only memory, a programmable read-only memory, an electrically erasable programmable memory, or register. The storage medium is located in the second memory, and the second processor reads information in the second memory and completes the steps of the foregoing methods in combination with its hardware. In order to avoid repetition, detailed description is not provided herein.

An embodiment of the disclosure further provides a computer storage medium, wherein the computer storage medium stores executable instructions; when the executable instructions are executed by the processor, the target detection method provided by any of the above embodiments of the present disclosure may be achieved; the target detection method may be quantizing the target detection model to obtain the quantized target detection model, wherein the decoupling head of the target detection model includes at least N detection frame regression branches, wherein N is a natural number between 2 and C, and C is the number of detection categories; acquiring an image to be detected, and performing image preprocessing on the image to be detected, wherein the image preprocessing includes at least one of the following: decoding conversion processing and normalization processing; using the quantized target detection model to detect the image to be detected; and processing the detection results with non-maximum suppression, which can make the lightweight model meet the requirements of speed and accuracy. In addition, by quantifying the target detection model, the model may be compressed without reducing the accuracy of the model, so that real-time target detection may be achieved on the edge computing platform, and may be applied to business scenarios such as smart finance, smart parks and smart transportation. The method of driving neural network inference acceleration by executing executable instructions is basically the same as the neural network inference acceleration method provided by the above embodiments of the present disclosure and will not be described here.

Those of ordinary skills in the art may understand that all or some of acts in the methods disclosed above, functional modules or units in systems and apparatuses may be implemented as software, firmware, hardware, and an appropriate combination thereof. In a hardware implementation mode, division of the function modules/units mentioned in the above description is not always division corresponding to physical components. For example, a physical component may have multiple functions, or several physical components may cooperate to execute a function or a step. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skills in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. Furthermore, it is well known to those of ordinary skill in the art that the communication medium typically contains computer readable instructions, a data structure, a program module, or other data in a modulated data signal such as a carrier or another transmission mechanism, or the like, and may include any information delivery medium.

Although the implementations disclosed in the present disclosure are described as above, the described contents are implementations which are used for facilitating the understanding of the present disclosure, and are not intended to limit the present invention. Any skilled person in the art to which the present disclosure pertains may make any modifications and variations in forms and details of implementation without departing from the spirit and scope of the present disclosure. However, the patent protection scope of the present invention should be subject to the scope defined by the appended claims.

The invention claimed is:

1. A neural network inference acceleration method, comprising:

acquiring a neural network model to be accelerated and an accelerated data set;

automatically performing accelerating process on the neural network model to be accelerated by using the accelerated data set to obtain the accelerated neural network model, wherein the accelerating process comprises at least one of the following: model compression, graph optimization and deployment optimization, wherein the model compression comprises at least one of the following: model quantification, model pruning and model distillation, wherein the graph optimization is optimization for a directed graph of the neural network model to be accelerated, and the deployment optimization is optimization for a deployment platform of the neural network model to be accelerated; and performing inference evaluation on the accelerated neural network model;

wherein the deployment optimization comprises at least one of the following:

according to the category of deployment platform, selecting the corresponding model acceleration tool to accelerate the model; and according to the software and hardware resources of the current deployment platform, selecting the corresponding software and hardware optimization strategy;

wherein when the corresponding software and hardware optimization strategy is selected according to the software and hardware resources of the current deployment platform, the method further comprises:

searching the software and hardware resources of a current deployment platform; and representing the software and hardware resources of the deployment platform by parameters, and evaluating the performance of the parameters by using a cost function.

2. The neural network inference acceleration method according to claim 1, the method further comprises: receiving a first input from a user, the first input comprises at least one of:

the minimum execution accuracy of the accelerated neural network model;

the minimum execution speed of the accelerated neural network model;

the lowest model compression ratio of the accelerated neural network model; and the type of the neural network model to be accelerated.

3. The neural network inference acceleration method according to claim 1, the method further comprises: outputting at least one of:

the accelerated neural network model;

the deployment platform;

software and hardware resources of the deployment platform; and categories and sub-categories of the accelerating process.

4. The neural network inference acceleration method according to claim 1, wherein the software and hardware optimization strategy comprises at least one of the following: parallel thread optimization, hardware built-in mapping optimization, loop optimization, memory allocation reading optimization, and memory latency hiding optimization.

5. The neural network inference acceleration method according to claim 1, wherein the graph optimization comprises at least one of:

eliminating unnecessary nodes;

replacing a more costly operator with a less costly operator;

fusing successive operators into one operator;

eliminating a calculated expression and using a calculated value as a replacement; and eliminating dead code.

6. The neural network inference acceleration method according to claim 1, wherein when model distillation is performed on the neural network model to be accelerated, acquiring at least two teacher models, copying the neural network model to be accelerated into multiple student models, training the multiple student models and the teacher models, and selecting the optimal student model as a distilled neural network model.

7. The neural network inference acceleration method according to claim 6, wherein when training the multiple student models and the teacher models, synchronously calculating three kinds of loss information in each iteration process, and feeding back to the multiple student models through a back propagation algorithm after adding the three kinds of loss information; the three types of loss information comprise:

real loss information obtained by comparing an output of each of the student models with a GroundTruth label;

distill loss information obtained by comparing an output of each of the student models with an output of multiple the teacher models; and scatter loss information obtained by comparing the outputs of the multiple student models with each other.

8. The neural network inference acceleration method according to claim 1, wherein the accelerated data set comprises a quantization calibration image set and a quantization test image set, using the accelerated data set to perform model quantification on the neural network model to be accelerated, comprises:

quantizing a first neural network model by using the quantization calibration image set to obtain a second neural network model, wherein the numerical accuracy of the second neural network model is less than the numerical accuracy of the first neural network model; and testing model accuracy of the second neural network model by using the quantization test image set, when the model accuracy of the second neural network model does not reach a preset model accuracy threshold, changing quantization strategy, and re-quantizing the first neural network model by using the changed quantization strategy and the quantization calibration image set until the model accuracy of the quantized second neural network model reaches the preset model accuracy threshold.

9. The neural network inference acceleration method according to claim 8, wherein the model accuracy of the second neural network model reaching a preset model accuracy threshold comprises:

execution accuracy of the second neural network model is greater than or equal to preset execution accuracy;

execution speed of the second neural network model is greater than or equal to a preset execution speed threshold; and model compression ratio of the second neural network model is greater than or equal to a preset model compression ratio threshold.

10. The neural network inference acceleration method according to claim 8, wherein the changing of quantization strategy comprises any one or more of the following: changing a quantization threshold algorithm, starting a hybrid numerical accuracy calculation.

11. A neural network inference acceleration device, comprising a memory; and a processor coupled to the memory, the processor is configured to, based on instructions stored in the memory, perform the steps of the neural network inference acceleration method according to claim 1.

12. A storage medium, on which a computer program is stored, and when the program is executed by a processor, the neural network inference acceleration method according to claim 1 is achieved.

13. A target detection method, comprising:

quantizing the target detection model to obtain the quantized target detection model, wherein a decoupling head of the target detection model comprises at least N detection frame regression branches, wherein N is a natural number between 2 and C, and C is the number of detection categories;

acquiring an image to be detected, and performing image preprocessing on the image to be detected, wherein the image preprocessing comprises at least one of the following: decoding conversion processing and normalization processing;

using the quantized target detection model to detect the image to be detected; and processing the detection results with non-maximum suppression;

wherein the quantizing of the target detection model comprises:

quantizing the first neural network model by using the quantization calibration image set to obtain a second neural network model, wherein the numerical accuracy of the second neural network model is less than the numerical accuracy of the first neural network model; and testing model accuracy of the second neural network model by using the quantization test image set, when the model accuracy of the second neural network model does not reach the preset model accuracy threshold, changing the quantization strategy, and re-quantizing the first neural network model by using the changed quantization strategy and the quantization calibration image set until the model accuracy of the quantized second neural network model reaches the preset model accuracy threshold.

14. A target detection device, comprising a memory; and a processor coupled to the memory, the processor is configured to, based on instructions stored in the memory, perform the steps of the target detection method according to claim 13.

15. A storage medium, on which a computer program is stored, and when the program is executed by a processor, the target detection method according to claim 13 is achieved.

\* \* \* \* \*